No. 668,026. Patented Feb. 12, 1901.
W. C. TEMPLES.
FERTILIZER DISTRIBUTER.
(Application filed Oct. 22, 1900.)
(No Model.) 2 Sheets—Sheet 1.
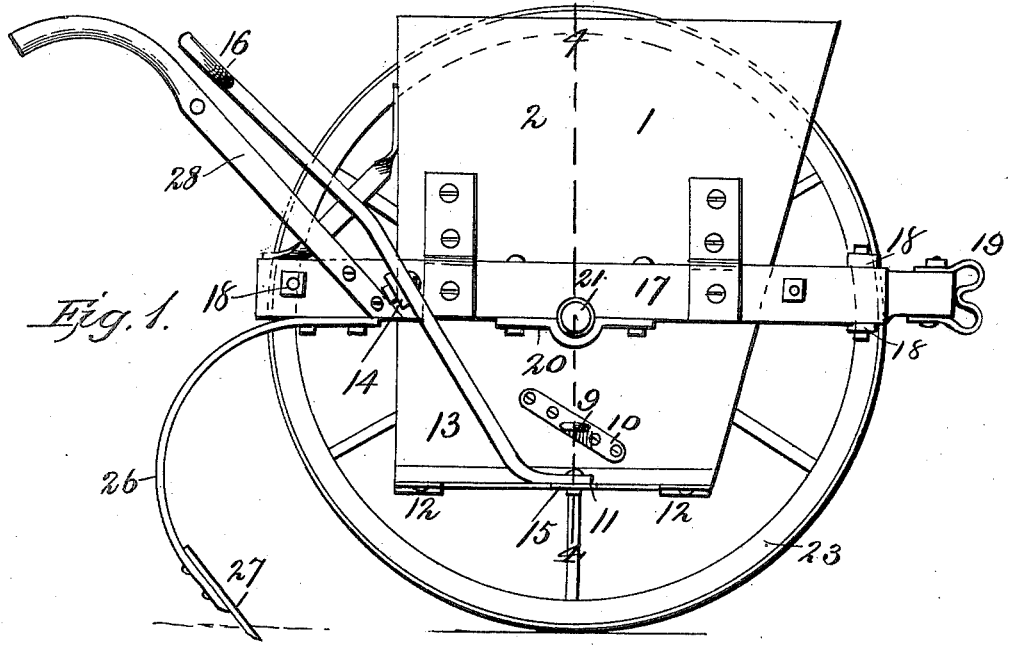
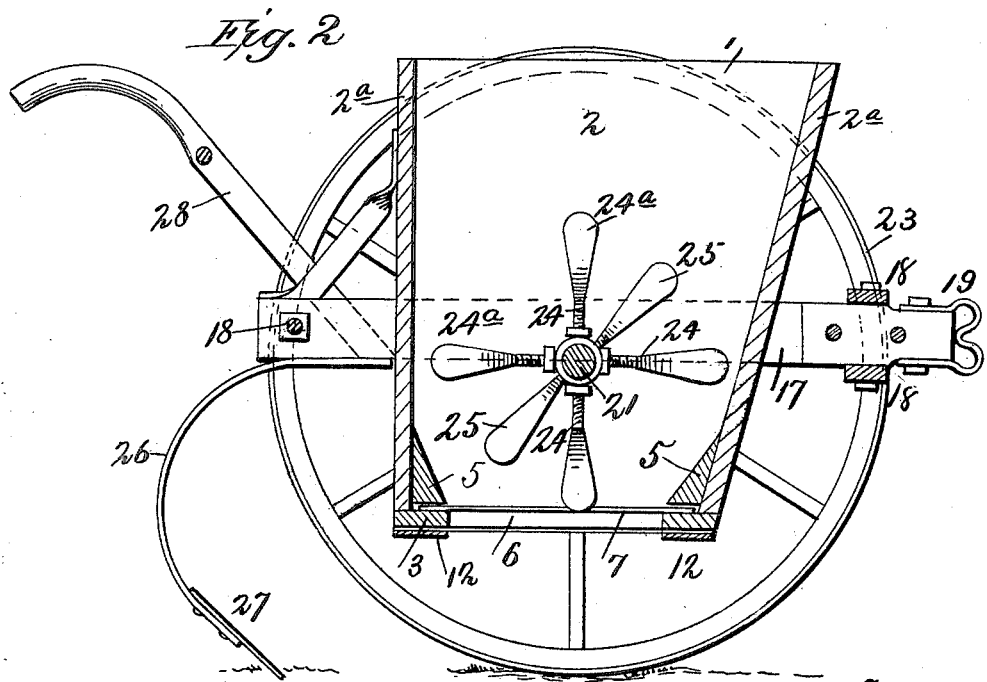
Witnesses:
F. L. Ourand
F. G. Radelfinger
Inventor.
W. C. Temples,
By Lewis Bagger & Co.
Attorneys.
THE NORRIS PETERS CO., PHOTO-LITHO., WASHINGTON, D. C.

No. 668,026. Patented Feb. 12, 1901.
W. C. TEMPLES.
FERTILIZER DISTRIBUTER.
(Application filed Oct. 22, 1900.)
(No Model.) 2 Sheets—Sheet 2.

Witnesses:
Franck L. Ourand
F. G. Radelfinger

Inventor:
W. C. Temples,
By Louis Bagger & Co.,
Attorneys.

THE NORRIS PETERS CO., PHOTO-LITHO., WASHINGTON, D. C.

UNITED STATES PATENT OFFICE.

WILLIAM C. TEMPLES, OF VERNAL, GEORGIA.

FERTILIZER-DISTRIBUTER.

SPECIFICATION forming part of Letters Patent No. 668,026, dated February 12, 1901.

Application filed October 22, 1900. Serial No. 33,980. (No model.)

*To all whom it may concern:*

Be it known that I, WILLIAM C. TEMPLES, a citizen of the United States, residing at Vernal, in the county of Randolph and State of Georgia, have invented new and useful Improvements in Fertilizer-Distributers, of which the following is a specification.

My invention relates to improvements in fertilizer-distributers; and the object of the same is to produce a distributer which will be simple in construction and efficient in operation in working with all kinds of fertilizer.

With this object in view my device consists of the novel construction hereinbelow described and claimed and which includes a complete system of adjustments by which my machine can be adapted to do efficient service under the most diverse conditions. Means are also provided for plowing in the grain mixed with the fertilizer.

Figure 3:
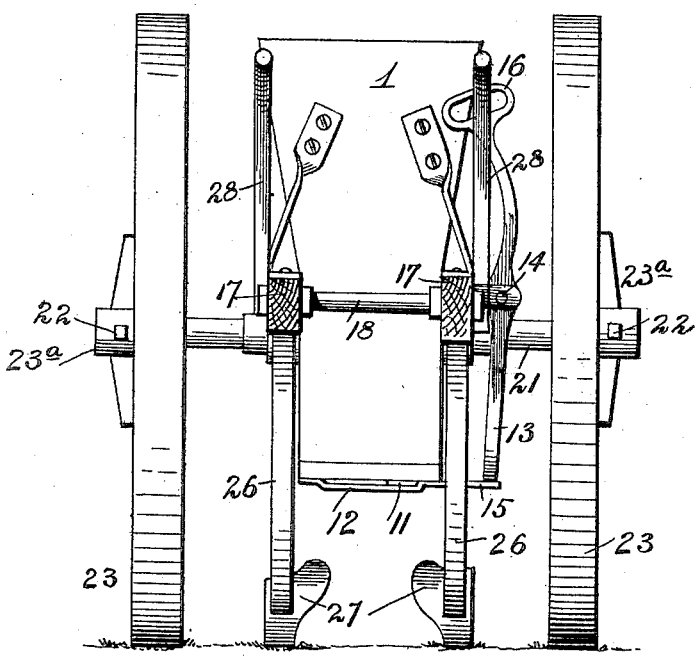
Figure 4:
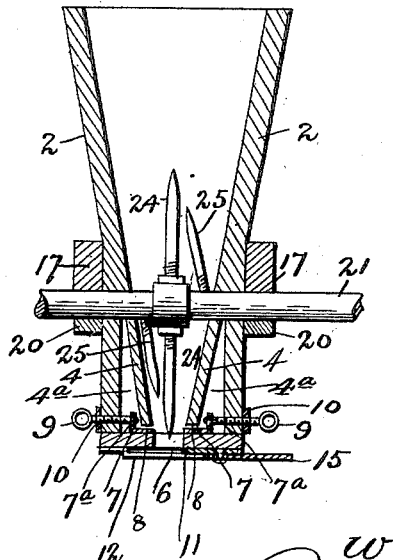

In the drawings which accompany this specification, and of which they form a part, Figure 1 is a side elevation of my device with one of the wheels detached. Fig. 2 is a longitudinal vertical section of the same. Fig. 3 is a rear elevation of the same. Fig. 4 is a transverse section on the line 4 4, Fig. 1.

Like numerals of reference designate like parts wherever they occur in the different views of the drawings.

The numeral 1 designates the hopper of my distributer, formed of side pieces 2, ends $2^a$, and a bottom 3. The sides 2 and ends $2^a$ slope gradually from the perpendicular. Secured inside the hopper, near the bottom thereof, is a second series of side and end pieces, 4 and 5, respectively. Small spaces $4^a$ are left between the members 2 and 4 to accommodate the screws for operating the slot-adjusting mechanism, which will be fully described. The bottom 3 is cut longitudinally by a slot 6, and the members 4 and 5 extend to the edge of this slot, and thus form guides for the fertilizer. The slot 6 is provided with means for regulating its width, which consists of a pair of plates 7, provided with arms $7^a$ and mounted to slide in guides 8, in combination with two adjusting-screws 9, mounted in threaded plates 10, secured to the sides 2 of the hopper. By this arrangement the width of the slot 6 can be adjusted at pleasure and the amount of fertilizer per acre regulated. A cut-off is also provided and comprises a plate 11, adapted to slide in guides 12, and a lever 13, fulcrumed at 14 and secured at its lower end to an arm 15, secured in turn to the plate 11. The lever is fitted with a handle 16, and it will be readily understood how by operating this handle the slot 6 may be closed.

Secured to the sides of the hopper 1 are bearing-plates 17, which are tied together at 18 and have attached to their forward ends at 19 means for hitching horses to the machine. A pair of boxes 20 are mounted on the strips 17, and journaled in these boxes is a shaft 21, which extends through the hopper. Keyed on the ends of the shaft 21 by means of set-screws 22 is a pair of wheels 23. These wheels 23 have hubs $23^a$, within which the set-screws 22 fit, and by this construction are rendered adjustable longitudinally of the shaft for rows of different widths. The wheels 23 are made large to give sufficient leverage for operating the feed mechanism now to be described.

The feed mechanism is mounted within the hopper 1 on the shaft 21 and consists of two series of blades. The first series, the members of which are each designated by the numeral 24, is screwed into the shaft 21 and positioned just above the slot 6. They are paddle-shaped on the ends $24^a$, are set edgewise, so as to cut their way through the material, and are of sufficient length to extend down into the slot 6 to a point just escaping the plate 11, so as to force the fertilizer through it. The second series of blades has two members, each denoted by the numeral 25. These blades 25 are paddle-shaped and are set at an angle to the axis 21 to bring them parallel to the sides 4 of the lower portion of the hopper, with their faces also parallel thereto. By this combination of the two series of blades the fertilizer can all be fed out of the hopper, as the inclined blades 25 will clear the sides and throw the material toward the center within reach of the blades 24, which will force it through the slot 6. It is obvious that I may employ any number of blades, arranged in the manner described; but it is believed that the advantage of freer operation is gained by employing but two of the inclined series.

A pair of curved arms 26 is secured to the under side of the rear ends of the bearing-plates 17, and mounted on the lower ends of these arms are shovel-plows 27. This arrangement of the plows 27, one on each side of the slot 6, insures the covering of the grain which is mixed with the compost or fertilizer which is being used. Handles 28 of ordinary construction are also attached to the plates 17 and serve as means for handling the implement. The function of each part of my machine has been set forth along with its description. Therefore no further explanation of its operation is deemed necessary.

Having described my invention, what I claim as new, and wish to secure by Letters Patent, is—

In a fertilizer-distributer, the combination, substantially as described, of a hopper having uniformly-sloping sides and provided with a slot extending longitudinally the bottom thereof, a shaft mounted transversely said hopper and having mounted thereon two series of blades, the first series comprising a number of paddle-shaped blades set at right angles to said shaft and projecting into said slot, and the second series comprising two paddle-shaped blades set parallel to the sloping sides of the hopper and thus adapted to throw the material in the hopper toward the center and to keep the sides clear, and means for revolving said shaft to actuate said blades.

In testimony whereof I have hereunto set my hand in presence of two subscribing witnesses.

WILLIAM C. TEMPLES.

Witnesses:
C. TAYLOR,
L. S. CHASTAIN.